Nov. 30, 1965  T. P. GOODMAN  3,220,247
VIBRATION VECTOR MEASUREMENT AND DISPLAY APPARATUS
Filed May 14, 1962  2 Sheets-Sheet 1

Inventor
Thomas P. Goodman
by Paul A. Frank
His Attorney

Nov. 30, 1965  T. P. GOODMAN  3,220,247
VIBRATION VECTOR MEASUREMENT AND DISPLAY APPARATUS
Filed May 14, 1962  2 Sheets-Sheet 2

COMPONENTS OF E(t)
(a)  (b)  (c)

TACHOMETER GENERATOR OUTPUT SIGNAL $A \cos \omega t$
(a)  (b)  (c)

MULTIPLIER OUTPUT
(a)  (b)  (c)

Inventor
Thomas P. Goodman
by Paul A. Frank
His Attorney

United States Patent Office 3,220,247
Patented Nov. 30, 1965

3,220,247
VIBRATION VECTOR MEASUREMENT AND
DISPLAY APPARATUS
Thomas P. Goodman, Schenectady, N.Y., assignor to General Electric Company, a corporation of New York
Filed May 14, 1962, Ser. No. 194,586
1 Claim. (Cl. 73—67)

This invention relates to vibration measurement and, in particular, to apparatus for detecting and measuring a vibration vector at a particular frequency.

It is frequently desirable, when a range of vibration frequencies are present in a system, to obtain accurate information as to the amplitude of a vibration at a particular frequency, which may vary with time, and the phase of the vibration relative to a reference vector. For example, in marine propulsion equipment, the correction of rotor unbalance is important to eliminate or minimize water-borne noise. Consequently, instrumentation is necessary to determine the character of the unbalance force which produces the rotor vibration and which may, for particular equipment, change with time due to, inter alia, wear, diversity in loading conditions, and mounting variations. The information so obtained is utilized to properly introduce appropriate corrective forces in order to neutralize the effect of the unbalance force resulting from equipment operation as well as to monitor the effect of the adjustment of corrective forces.

Prior art instrumentation systems have lacked flexibility and have either not furnished sufficient data as to the character of the unbalance force or have furnished the data utilizing complex, non-standard, mechanical display means. One type of prior art device presents information as to the magnitude of the unbalance force on a meter, but does not indicate the phase angle of this unbalance force relative to a reference. In addition, this type of device does not allow adjustment of time constant to allow the observer to choose between or compromise, the conflicting requirements of precision and observation of instantaneous changes in vibration level. Another type of prior art instrumentation system utilizes wattmeters having mechanical damping means and presents the information as to magnitude and phase by means of a complex mechanical display. Still another type of prior art system requires a manual adjustment to obtain a null or maximum reading in order to ascertain the phase of the unbalance force.

It is an object of the invention to provide an improved apparatus for measuring the magnitude and phase of a vibration vector.

It is an object of the invention to provide an improved apparatus for measuring the magnitude and phase of a vibration vector at a particular frequency.

It is another object of the invention to provide an improved apparatus for measuring, in the presence of noise and vibrations having a range of frequencies, the amplitude and phase of a vibration vector, developed in associated equipment, at a particular frequency which may vary in accordance with the operation of the associated equipment.

It is another object of the invention to provide an improved apparatus for measuring the amplitude and phase of a vibration vector which utilizes standard electronic components.

It is another object of the invention to provide an apparatus for measuring the amplitude and phase of a vibration vector which enables adjustment of the time constant of a component of the apparatus to allow selection of a display which compromises between precision and the observation of instantaneous changes.

It is a further object of the invention to provide an apparatus for measuring the amplitude and phase of a vibration vector which incorporates electronic display means for simultaneous presentation of information as to the amplitude and phase of the vibration vector.

Briefly stated, in accordance with the illustrated embodiment of the invention, an electromechanical transducer is provided to sense the vibration of the associated equipment and provide an electrical output signal representative thereof. A tachometer generator, coupled to the rotor of the associated equipment, provides two reference signals at the frequency of interest; e.g., the rotor frequency, which are out of phase with respect to each other. One of the generated signals and the transducer output signal are applied to an electronic multiplier in a first channel to derive a signal having a D.C. component proportional to the amplitude of the detected vibration component which is at the reference frequency and which is in phase with the generated reference signal. A second electronic multiplier in a second channel is provided to similarly derive a signal having a D.C. voltage level proportional to the amplitude of the vibration component at the reference frequency and in phase with the other of the two generated reference signals. The respective multiplier output signals are applied to associated filters, having adjustable time constants, to eliminate or reduce the A.C. components introduced by the multiplier, in particular the component at twice the frequency of interest, and other A.C. components present in the signals due to noise, out-of-phase vibrations, or vibrations at frequencies other than the frequency of interest. The respective filtered signals from the first and second channels are applied to the X and Y-axis deflection plates of a cathode ray oscilloscope having a polar coordinate grid superimposed on the screen. The resulting display illustrates the amplitude of the vibration vector at the desired frequency and its phase relative to the generated reference signals. Due to the fact that the generator which provides the reference signals is driven by the equipment whose vibration characteristic is to be measured, the frequency of the reference signals always corresponds to the vibration frequency of interest in spite of changes in the later frequency due to; e.g., variations in rotor rotational speed. Thus, the instrumentation apparatus of the invention is self-tuning.

The subject matter of the invention is particularly pointed out and distinctly claimed in the concluding portion of the specification. The invention, however, both as to organization and method of operation, may best be understood by reference to the following description taken in connection with the accompanying drawings, in which:

Figure 1:
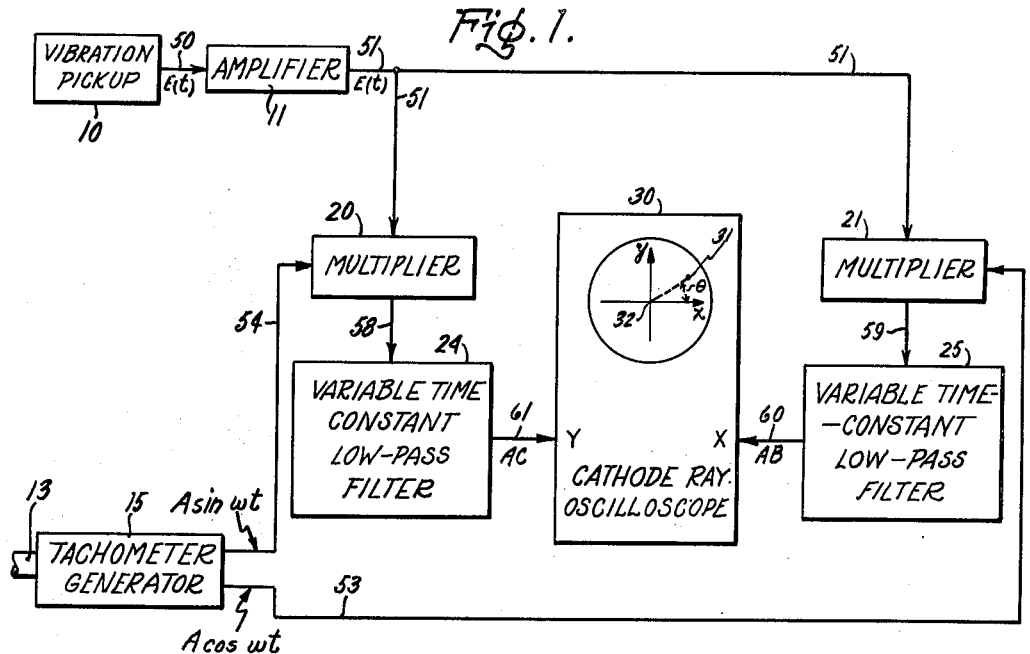
FIGURE 1 is a block diagram of the vibration instrumentation apparatus of the invention.

With reference to FIGURE 1, vibration pickup 10 is attached to the equipment whose vibration characteristics are to be measured. For example, use of the apparatus of the invention with marine propulsion equipment may require that the pickup 10 be attached to a specific point on the rotor bearing pedestal of the equipment. Pickup 10 may be an electromechanical transducer which produces an electrical output signal proportional to the vibratory displacement, velocity, or acceleration of the point to which the pickup is attached. The output signal of the pickup includes a component representing vibration at the frequency of rotation of the rotor shaft, as well as noise components and components representing vibrations at frequencies other than the frequency of shaft rotation. The output of pickup 10 may thus be considered to be a time varying signal $E(t)$ containing a variety of frequencies. The pickup output signal is applied to amplifier 11 over line 50 and amplified thereby, the amplified signal being applied to line 51.

Shaft 13, which is the main rotor shaft of the equipment or is driven thereby, rotates at an angular velocity which is a function of the frequency of interest; i.e., the frequency of rotation of the main rotor shaft. Shaft 13 drives tachometer generator 15 which generates two output signals having frequencies equal to the rotor frequency. The first output signal on line 53 is a cosine wave A cos wt. and serves as a reference signal. The second output signal of tachometer generator 15 on line 54 is a sine wave A sin wt and hence 90° out of phase with the cosine wave on line 53. Although the embodiment of the invention described herein employs reference signals which are phase displaced by 90°, the invention may be practiced utilizing reference signals which are phase displaced by angles other than 90°. In this event, well known computing techniques may be used to derive the resultant.

Having established reference signals having frequencies equal to the rotor frequency and having available a signal $E(t)$ containing components representing vibrations at various frequencies including the rotor frequency, which in the embodiment shown is the frequency of interest, the component of $E(t)$ at rotor frequency can be derived by electronically implementing the Fourier analysis of signal $E(t)$. Thus, with A cos wt. and A sin wt. being reference signals at the rotor frequency and letting B cos wt. and C sin wt. be the components of $E(t)$ which are at the frequency of interest and respectively in phase and 90° out of phase with the signal A cos wt., the desired information as to magnitude and phase can be derived by Fourier analysis as follows:

$B = 2 \times$ average value of $E(t)$ cos wt.    (1)
$C = 2 \times$ average value of $E(t)$ sin wt.    (2)
$\sqrt{B^2 + C^2}$ = magnitude of the component of $E(t)$ which is at the frequency of interest.    (3)
$\tan^{-1}(C/B)$ = phase angle by which the component of $E(t)$ at the frequency of interest lags the reference vector A cos wt.    (4)

With $E(t)$ available on line 51 and A cos wt. and A sin wt. available on lines 53 and 54 respectively, the multiplication and averaging functions indicated by Equations 1 and 2 are performed electronically, in accordance with the invention. The multiplication of $E(t)$ on line 51 and A cos wt. on line 53 is performed by multiplier 21 in one signal channel, while the multiplication of $E(t)$ on line 51 and A sin wt. on line 54 is similarly effected by multiplier 20 in another signal channel. Multipliers 20 and 21 may be any of a variety of multipliers known in the art, as disclosed in Johnson, "Analog Computer Techniques," New York, McGraw-Hill, 1956, page 145. The D.C. component of each of the multiplier outputs is proportional to the component of $E(t)$ at the frequency of the tachometer generator output signals, which is the frequency of interest, and in phase with the respective tachometer generator output signals. It should be noted that the apparatus of the invention is self-tuning in that the frequency of the vibration of interest and the frequency of the reference signals always correspond because both are a function of the rotational velocities in the equipment being monitored. Hence, in the embodiment shown, the frequency of the reference signals generated by tachometer generator 15 is equal to the frequency of the rotor and the vibration desired to be monitored and changes simultaneously with variations of rotor frequency.

The averaging operation required by Equations 1 and 2 is performed by low-pass filters 24 and 25, the respective outputs of multipliers 20 and 21 being applied thereto over lines 58 and 59, respectively. The average value and the D.C. component of an electrical signal are the same so that the outputs of multipliers 20 and 21 are averaged by removing the A.C. components in low-pass filters 24 and 25, respectively. However, the removal of all A.C. components in the output signals of the multipliers would require that the filters 24 and 25 have a large time constant. In this event, the response of the filters to a change in the magnitude or phase of a vibration at the frequency of interest would be correspondingly slow. On the other hand, the removal of A.C. components by the filters must be sufficient to render the filter outputs an accurate representation of the average value of the outputs of the multipliers. The primary purpose of the instrumentation is to allow monitoring the unbalance vibration and the effect of concurrent corrective adjustment of neutralizing vibrations. Thus, a compromise between a long time constant, expedient for filtering out all A.C. components, and a short time constant, advantageous for quick response to changes in amplitude and phase of the unbalance vibration, is desirable. In accordance with the invention, the filters 24 and 25 are provided with adjustable time constants, as described subsequently with reference to FIGURE 6, to enable selection of a time constant that offers the best compromise between the two conflicting requirements in a given situation. For example, if spurious vibrations having a frequency very close to the frequency of the vibration of interest are present, a relatively long time constant is desirable to minimize the effect of the spurious vibrations on the display. Conversely, in the absence of frequencies proximate to the frequency of interest, a short time constant permitting rapid response of the output to vibratory variations is desirable.

The output of filter 25, representing the component of $E(t)$ at the rotor frequency and in phase with the reference signal A cos wt., is applied over line 60 to the X-axis deflection plates of cathode ray oscilloscope 30 and is designated AB. This signal is the electrical analog of B, the dependent variable in the solution of Equation 1 and includes a constant multiplicant A representing the amplitude of the reference signal. The output of filter 24, representing the component of $E(t)$ at the rotor frequency and in phase with the reference signal A sin wt., is applied over line 61 to the Y-axis deflection plates of oscilloscope 30. This signal is the electrical analog of C, the dependent variable in the solution of the Equation 2 and also includes the factor A. The cathode ray oscilloscope functions to solve Equations 3 and 4 by plotting the component A.C. against the component AB to derive a vector representation on the oscilloscope screen depicting the magnitude of the component $E(t)$ at rotor frequency and the phase angle $\theta$ of this component relative to the reference vector A cos wt. The invention is not, however, limited to use with a cathode ray oscilloscope. Other display means; e.g., a pair of voltmeters, may be employed.

Figure 2:
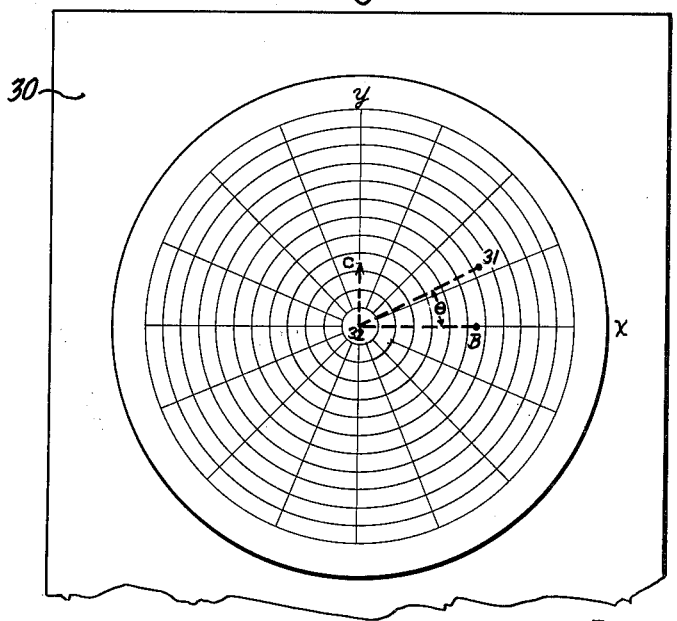
FIGURE 2 illustrates on an enlarged scale a polar coordinate display of the amplitude and phase angle of a vibration vector presented on the oscilloscope of FIGURE 1.

With reference to FIGURE 2, the resolution of the orthogonal components B and C into a resultant vector on the cathode ray tube screen is more clearly illustrated. The component AB from filter 25 causes a deflection of the electron beam of oscilloscope 30 along the X-axis of the display screen for a distance proportional to the magnitude of B. Similarly, the component A.C. from filter 24 causes a deflection of the electron beam of oscilloscope 30 along the Y-axis of the display screen for a distance proportional to the magnitude of C. Thus, the electron beam is deflected, for example, to a point 31 on the display screen which is a distance from the origin 32 equal to $\sqrt{B^2 + C^2}$, thus solving Equation 3 and indicating the magnitude of the vibration component of E(t) at the rotor frequency.

The display also furnishes information as to the phase angle θ of the vibration vector 32–31 with respect to the reference signal A cos wt., as indicated in FIGURE 2, thus graphically solving Equation 4. Hence, the magnitude and phase angle of the vibration component at the rotor frequency are displayed and available for monitoring the effect of adjustments in the equipment whereby neutralizing forces are sought to be introduced to cancel the unbalance force causing the vibration.

Figure 3:
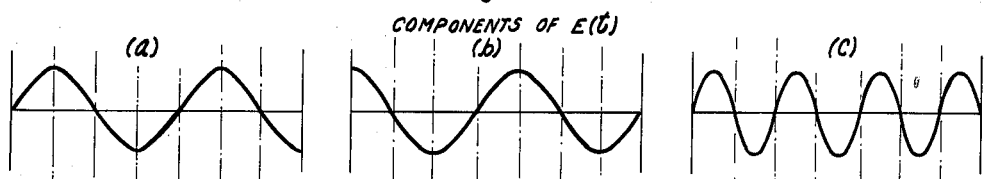
FIGURES 3, 4 and 5 are waveform diagrams illustrating the operation of the multipliers of FIGURE 1.
Figure 4:
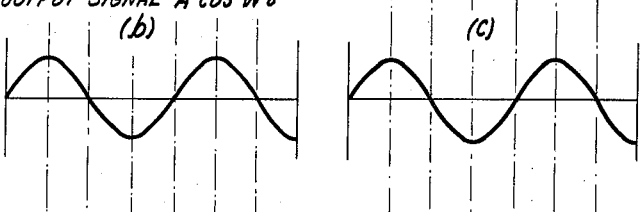
Figure 5:
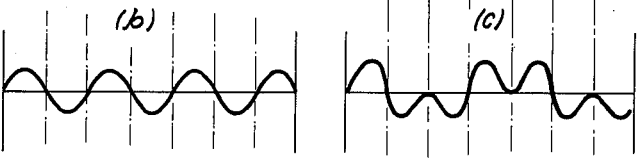

FIGURE 3 illustrates various waveforms which may be present in the output signal E(t) of vibration pickup 10, while FIGURE 4 illustrates the reference signal A cos wt. generated by tachometer generator 15. FIGURE 5 indicates the results of the multiplying operation in multiplier 21 for the signals illustrated. The signals of FIGURES 3(a) and 4(a) are at the same frequency and in phase, and their multiplication produces a signal having a D.C. component as shown in FIGURE 5(a). The signal of FIGURE 3(b) is at the reference frequency but 90° out of phase with the signal of FIGURE 4(b) and multiplication produces a signal having only A.C. components as shown in FIGURE 5(b). The frequency of the signal of FIGURE 3(c) is a multiple of the reference frequency signal of FIGURE 4(c), and the multiplication again produces an output signal shown in FIGURE 5(c), having only A.C. components. Thus, D.C. components are present in the outputs of multipliers 20 and 21 only when the signal E(t) contains components at the same frequency as, and in phase with, the respective reference signals, the resultant D.C. components being proportional to the in-phase, reference frequency, components of E(t).

Figure 6:
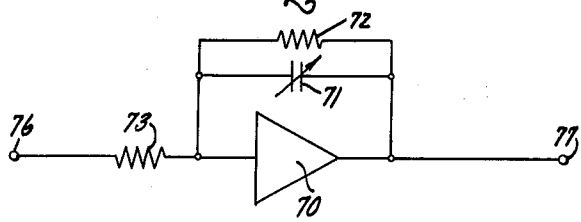
FIGURE 6 is a circuit diagram of a variable time-constant, low-pass filter which may be used in the apparatus of FIGURE 1.

FIGURE 6 illustrates a variable time-constant, low-pass filter which may be used in the apparatus of the invention to provide flexibility of application to various vibrational instrumentation problems. Amplifier 70 is a conventional high-gain amplifier of the operational type with the parallel combination of variable capacitor 71 and resistor 72 forming a feedback path. Resistor 73 is connected to the input terminal of amplifier 70. The input signal is applied to terminal 76 and the filtered output signal is available at terminal 77. The time constant T of the filter circuit is expressed by the equation:

$$T = RC \qquad (5)$$

where R is equal to the value of resistor 72, and C is equal to the value of capacitor 71. Thus, by varying the effective value of variable capacitor 71, the time constant T can be changed as desired by the operator to obtain the optimum display. Alternatively, capacitor 71 may be replaced by a fixed capacitor and resistances 72 and 73 may be made variable to adjust the time constant of the filter.

Although the invention and its operation has been described with reference to a specific embodiment, the invention is not limited to this embodiment. Many modifications within the spirit and scope of the invention will be obvious to those skilled in the art. For example, a tachometer generator need not be used to provide reference signals, but rather any source of signals out of phase with each other and at the frequency of interest may be used. The apparatus of the invention is not limited to measurement of rotor frequency but may be adapted to measure a vibration at any frequency upon selection of appropriate reference signals. In addition, the apparatus of the invention may be used with an input other than an electromechanical transducer. The display is not limited to a cathode ray oscilloscope but any convenient display means may be employed. It is thus intended that the invention is not limited to the particular details shown and described which may be varied without departing from the spirit and scope of the invention and the appended claims.

What is claimed as new and desired to be secured by Letters Patent of the United States is:

Apparatus for measuring a vibration vector at a frequency comprising:
(a) a transducer adapted to derive electrical signals representative of mechanical vibrations including vibrations at the frequency,
(b) a tachometer generator adapted to be driven by the equipment whose vibration characteristic is to be measured having a first output comprising a reference signal at the frequency and a second output comprising a reference signal at the frequency and 90° out of phase with the first output,
(c) a first channel comprising:
  (1) a first multiplier connected to said transducer and to the first output of said tachometer generator for multiplying the output signal of said transducer and the first output signal of said tachometer generator,
  (2) a first low-pass filter having an adjustable time constant,
  (3) means connecting the output signal of said first multiplier to said first low-pass filter,
(d) a second channel comprising:
  (1) a second multiplier connected to said transducer and to the second output of said tachometer generator for multiplying the output signal of said transducer and the second output signal of said tachometer generator,
  (2) a second low-pass filter having an adjustable time constant,
  (3) means connecting the output signal of said second multiplier to said second low-pass filter,
(e) a cathode ray oscilloscope,
(f) means connecting the output signal of said first low-pass filter to one pair of deflection plates of said cathode ray oscilloscope, and
(g) means connecting the output signal of said second low-pass filter to the other pair of deflection plates of said cathode ray oscilloscope to derive a display representing the amplitude and phase of the vibration at the frequency.

References Cited by the Examiner

UNITED STATES PATENTS

| | | | |
|---|---|---|---|
| 2,695,516 | 11/1954 | Petroff | 73—465 X |
| 2,722,830 | 11/1955 | Federn et al. | 73—463 |
| 2,924,977 | 2/1960 | Kenyon et al. | 73—465 |
| 2,982,942 | 5/1961 | White | 73—67 X |
| 3,041,881 | 7/1962 | Hack et al. | 73—463 |
| 3,091,125 | 5/1963 | Budnick et al. | 73—462 |

FOREIGN PATENTS 821,556  10/1959  Great Britain.

RICHARD C. QUEISSER, *Primary Examiner.*

M. A. MORRISON, *Examiner.*